United States Patent
Lacko

(10) Patent No.: US 10,641,208 B2
(45) Date of Patent: May 5, 2020

(54) TRANSLATING NOZZLE FOR MIXED FLOW TURBOFAN ENGINE

(71) Applicant: ROHR, INC., Chula Vista, CA (US)

(72) Inventor: Anthony Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 333 days.

(21) Appl. No.: 15/822,505

(22) Filed: Nov. 27, 2017

(65) Prior Publication Data
US 2019/0162136 A1     May 30, 2019

(51) Int. Cl.
| | | |
|---|---|---|
| *F02K 1/76* | (2006.01) | |
| *F02K 1/60* | (2006.01) | |
| *F02K 3/06* | (2006.01) | |
| *F02K 1/70* | (2006.01) | |

(52) U.S. Cl.
CPC .............. *F02K 1/763* (2013.01); *F02K 1/60* (2013.01); *F02K 1/605* (2013.01); *F02K 1/70* (2013.01); *F02K 3/06* (2013.01); *F05D 2220/323* (2013.01)

(58) Field of Classification Search
CPC . F02K 1/763; F02K 1/60; F02K 1/605; F02K 1/62; F02K 1/625; F02K 1/70; F02K 1/72
See application file for complete search history.

(56) References Cited

U.S. PATENT DOCUMENTS

| | | | | |
|---|---|---|---|---|
| 2,976,681 | A | * | 3/1961 | Pearson ............... F02K 1/48 239/265.29 |
| 3,591,085 | A | * | 7/1971 | Medawar .............. F02K 1/36 239/265.13 |
| 2002/0184874 | A1 | * | 12/2002 | Modglin ............... F02K 1/60 60/226.1 |
| 2012/0096831 | A1 | * | 4/2012 | Do ...................... F02K 1/06 60/226.1 |

FOREIGN PATENT DOCUMENTS

GB     2252279    *   8/1992 ............ F02K 1/605

* cited by examiner

*Primary Examiner* — Andrew H Nguyen
(74) *Attorney, Agent, or Firm* — Snell & Wilmer L.L.P.

(57) ABSTRACT

A thrust reverser for a gas turbine engine includes a reverser door pivotally mounted to a frame, an exhaust duct translationally mounted to the frame and an actuator having an actuator rod connected to the reverser door and to the exhaust duct.

14 Claims, 4 Drawing Sheets

TRANSLATING NOZZLE FOR MIXED FLOW TURBOFAN ENGINE

FIELD

The present disclosure relates generally to aircraft gas turbine engines and, more particularly, to pre-exit pivot door thrust reversers used with turbofan gas turbine engines.

BACKGROUND

Turbofan gas turbine engines are known to include a fan section that produces a bypass airflow for providing the majority of engine propulsion and a core engine section in which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include thrust reversers capable of redirecting the bypass airflow from the rearward direction to, at least partially, a forward direction thus producing a rearward thrust. The rearward thrust may serve to decelerate the forward motion of an aircraft and thereby assist braking the aircraft upon landing.

SUMMARY

A thrust reverser is disclosed. In various embodiments, the thrust reverser includes a reverser door pivotally mounted to a frame, an exhaust duct translationally mounted to the frame and an actuator having an actuator rod connected to the reverser door and to the exhaust duct. The thrust reverser may further include a door link connecting the reverser door to the actuator rod and a translating member connecting the exhaust duct to the actuator rod. In various embodiments, a first support member is mounted to the frame and the translating member is configured to translate linearly with respect to the first support member. In various embodiments, a beam link connects the translating member to the actuator rod.

In various embodiments, the translating member includes a first beam configured to translate linearly with respect to the first support member. The translating member may further include a second beam spaced apart from the first beam, with the first beam and the second beam connected by one or more rung members. In various embodiments, a bearing system is positioned between the first beam and the first support member. In various embodiments, the actuator includes a base connected to fixed (or non-translating) structure such as a frame or bulkhead and the actuator rod is configured to translate linearly with respect to the base. In various embodiments, the frame includes a first side beam, with the reverser door being pivotally mounted to the first side beam and the exhaust duct being translationally mounted to the first side beam. In various embodiments, the frame includes a second side beam and the reverser door is pivotally mounted to both the first side beam and the second side beam. In various embodiments, the thrust reverser includes a second actuator having a second actuator rod connected to the reverser door and to the exhaust duct. In various embodiments, a second door link connects the reverser door to the second actuator rod, a second translating member connects the exhaust duct to the second actuator rod and a second beam link connects the second translating member to the second actuator rod.

In various embodiments, a thrust reverser for a turbofan engine is disclosed. The thrust reverser may include an upper reverser door pivotally mounted to a frame and a lower reverser door pivotally mounted to the frame, an exhaust duct translationally mounted to the frame, a first actuator having a first actuator rod connected to the upper reverser door, the lower reverser door and the exhaust duct and a second actuator having a second actuator rod connected to the upper reverser door, the lower reverser door and the exhaust duct.

In various embodiments, the thrust reverser includes a first upper door link connecting the upper reverser door to the first actuator rod and a second upper door link connecting the upper reverser door to the second actuator rod. In various embodiments, a first lower door link connects the lower reverser door to the first actuator rod and a second lower door link connects the lower reverser door to the second actuator rod. In various embodiments, a first translating member connects the exhaust duct to the first actuator rod and a second translating member connects the exhaust duct to the second actuator rod. In various embodiments, a first beam link connects the first translating member to the first actuator rod and a second beam link connects the second translating member to the second actuator rod.

In various embodiments, a gas turbine engine includes a core engine, a nacelle surrounding the core engine, a fan operably connected to the core engine and configured to drive air along a flow path in a bypass duct between the nacelle and an outer casing of the core engine, a mixing section where exhaust from the core engine is mixed with the air in the flow path as the air exits the flow path and a thrust reverser downstream of the mixing section. In various embodiments, the thrust reverser includes an upper reverser door pivotally mounted to a frame and a lower reverser door pivotally mounted to the frame, an exhaust duct translationally mounted to the frame, a first actuator having a first actuator rod connected to the upper reverser door, the lower reverser door and the exhaust duct and a second actuator having a second actuator rod connected to the upper reverser door, the lower reverser door and the exhaust duct.

In various embodiments, the thrust reverser for the gas turbine engine may further include a first upper door link connecting the upper reverser door to the first actuator rod and a second upper door link connecting the upper reverser door to the second actuator rod, a first lower door link connecting the lower reverser door to the first actuator rod and a second lower door link connecting the lower reverser door to the second actuator rod, a first translating member connecting the exhaust duct to the first actuator rod and a second translating member connecting the exhaust duct to the second actuator rod.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Figure 1:
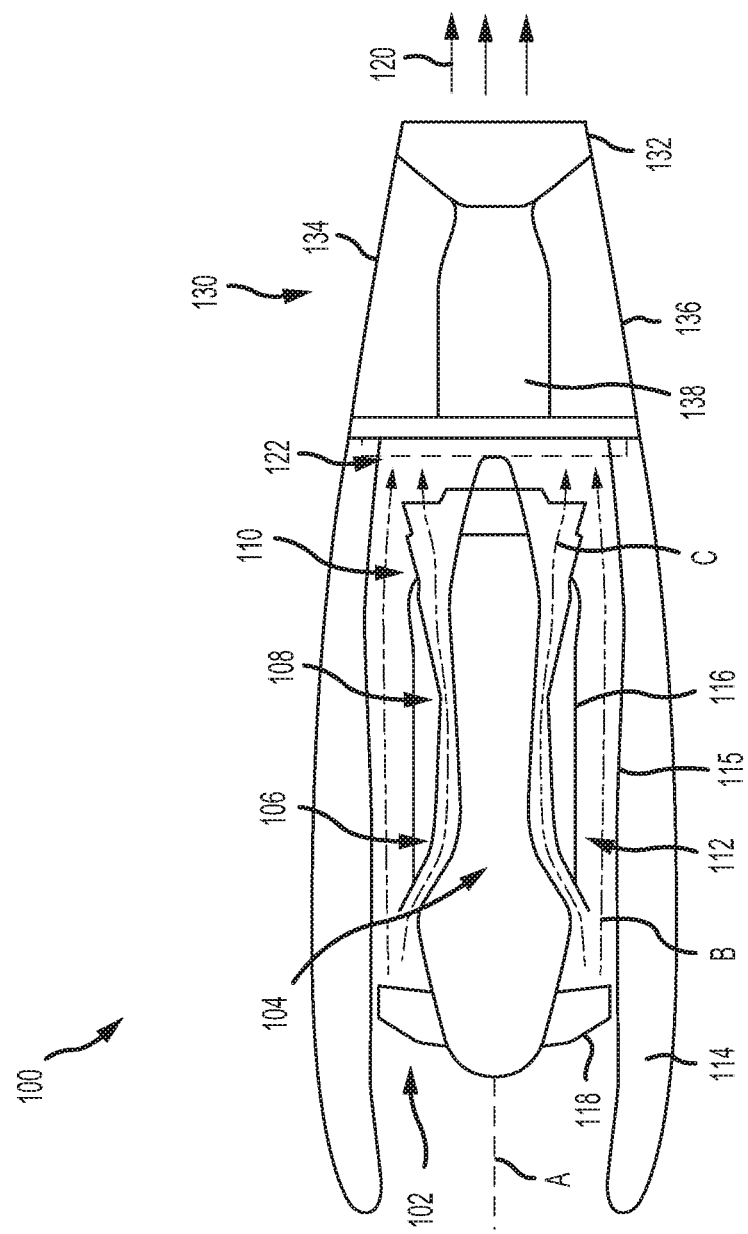
FIG. 1 is a schematic view of a gas turbine engine, in accordance with various embodiments.

Referring now to the drawings, FIG. 1 schematically illustrates a gas turbine engine 100 of the turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed, stowed or retracted position, as illustrated in FIG. 1. The thrust reverser 130 further includes an upper reverser door 134, a lower reverser door 136 and a pair of opposing side beams 138, which house actuator componentry and connecting members used to open and close the upper reverser door 134 and lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 provides the reverse thrust used to decelerate the aircraft upon landing. As further discussed below, concurrent with the opening and closing of the upper reverser door 134 and the lower reverser door 136, the annular exhaust duct 132 is translated in an aft and fore direction, respectively, to accommodate, among other things, the opening and closing of the reverser doors.

Figure 2:
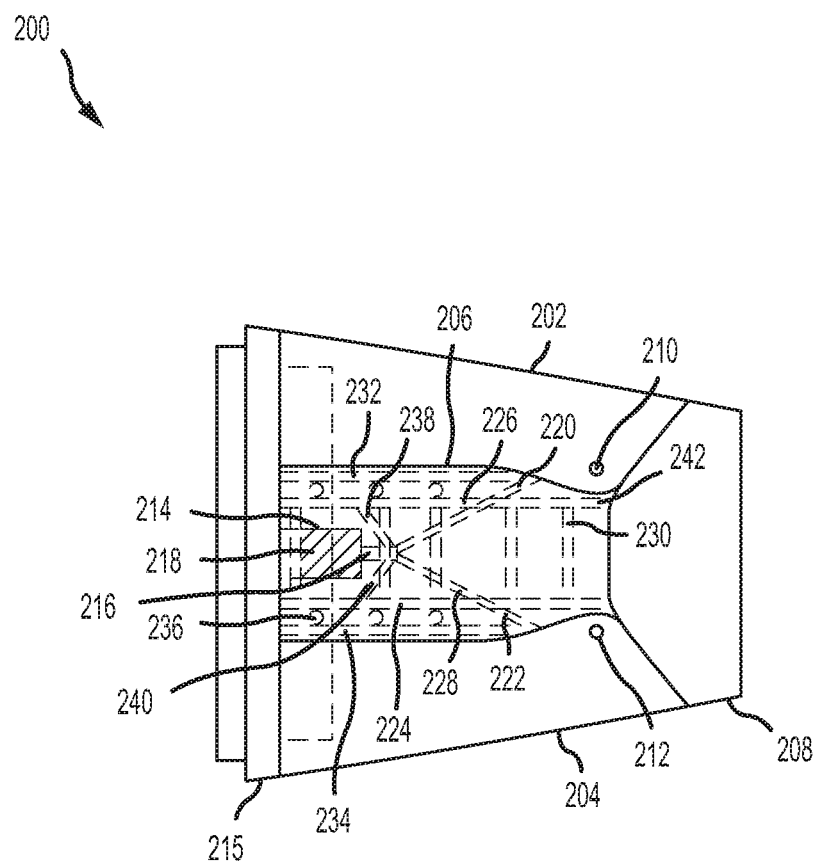
FIG. 2 is a schematic view of a stowed thrust reverser for a gas turbine engine, according to various embodiments.

Referring now to FIG. 2, a side view of a thrust reverser 200 according to various embodiments is illustrated in the closed, stowed or retracted position. The thrust reverser 200 includes an upper reverser door 202, a lower reverser door 204, a pair of opposing side beams 206 (only one is shown) and an exhaust duct 208. As described in more detail below, the pair of opposing side beams 206 provide a frame or structural support for mounting related components and operating the thrust reverser between deployed and retracted positions. For example, an upper pivot 210 is mounted to a respective one of the opposing side beams 206 and facilitates rotation of the upper reverser door 202 between open and closed states within the thrust reverser 200. Similarly, a lower pivot 212 is mounted to a respective one of the opposing side beams 206 and facilitates rotation of the lower reverser door 204 between open and closed states within the thrust reverser 200. A pair of actuators 214 is also mounted to respective ones of the opposing side beams 206 or, alternatively, to a base member 215 that is connected to a nacelle, such as the nacelle 114 referred to in FIG. 1. Each one of the pair of actuators 214 may include an actuator rod 216 and an actuator base 218 within which the actuator rod 216 retracts or extends. The actuators 214 may be hydraulically, electrically or otherwise mechanically powered and configured for extending or retracting the actuator rod 216 for pivoting the upper reverser door 202 and the lower reverser door 204 between open and closed positions and, respectively, for translating the exhaust duct 208 between aft and fore positions.

The thrust reverser 200 is configured to open and close the upper reverser door 202 and the lower reverser door 204 and to translate fore and aft the exhaust duct 208 in response to the actuator 214 in a parallel manner—e.g., rotation of the reverser doors and translation of the exhaust duct are independently responsive to movement of the actuator 214. More specifically, in various embodiments, and with specific reference to one side of the thrust reverser 200, the thrust reverser 200 includes an upper door link 220 having a first end pivotally mounted to the actuator rod 216 and a second end pivotally mounted to the upper reverser door 202. Similarly, a lower door link 222 has a first end pivotally mounted to the actuator rod 216 and a second end pivotally mounted to the lower reverser door 204. As the actuator rod 216 extends and retracts with respect to the actuator base 218 (i.e., moves fore and aft), the upper door link 220 pivotally urges the upper reverser door 202 and the lower door link 222 pivotally urges the lower reverser door 204 into open and closed positions, respectively.

The thrust reverser 200 also includes a translating member 224 configured to translate the exhaust duct 208 fore and aft. In various embodiments, the translating member 224 includes an upper beam 226 and a lower beam 228. The upper beam 226 and the lower beam 228 may be connected together by one or more rung members 230. The upper beam 226 may be slidably engaged with an upper support member 232 and the lower beam 228 may be slidably engaged with a lower support member 234. A plurality of rollers 236 or similar members, such as ball bearings, positioned between respective pairs of the upper beam 226 and the upper support member 232 and the lower beam 228 and the lower support member 234 enable the translating member 224 to translate fore and aft. An upper beam link 238 connects the upper beam 226 to the actuator rod 216 and a lower beam link 240 connects the lower beam 228 to the actuator rod 216. A distal end 242 of the translating member 224 is connected to the exhaust duct 208. As the actuator rod 216 extends and retracts with respect to the actuator base 218 (i.e., moves fore and aft), the upper beam link 238 translationally urges the upper beam 226 and the lower beam link 240 translationally urges the lower beam 228 and, hence, the exhaust duct 208 into fore and aft positions, respectively.

Figure 3:
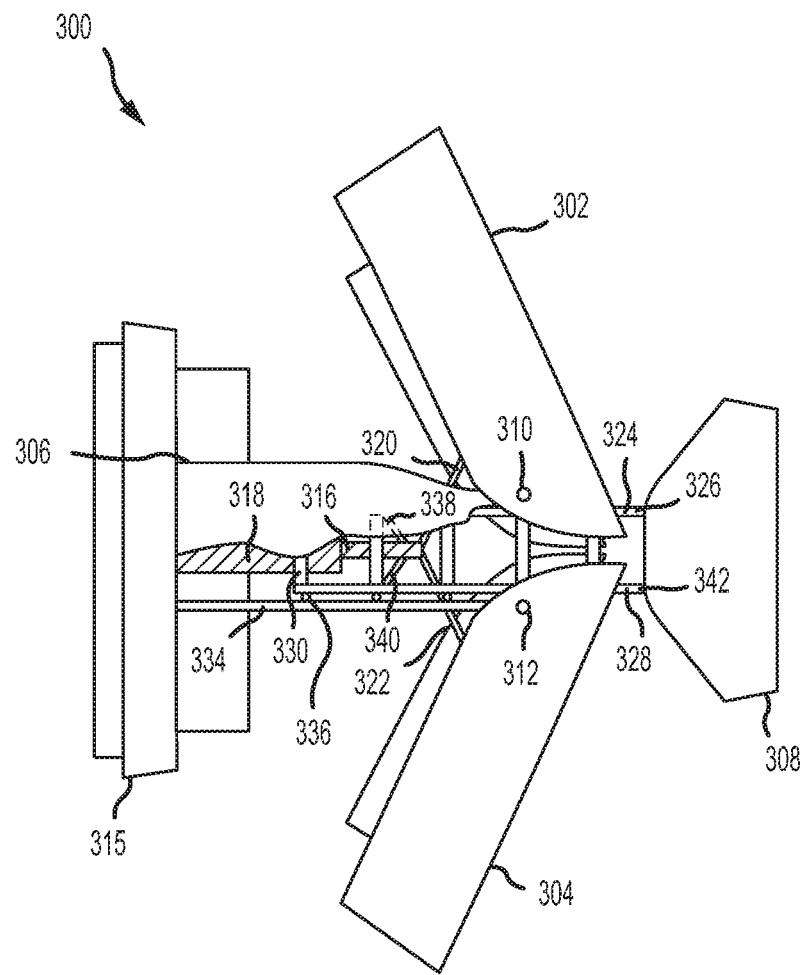
FIG. 3 is a schematic view of a deployed thrust reverser for a gas turbine engine, according to various embodiments.

Referring now to FIG. 3, a side view of a thrust reverser 300 according to various embodiments is illustrated in the open or deployed position. Similar to the foregoing description with reference to FIG. 2, the thrust reverser 300 includes an upper reverser door 302, a lower reverser door 304, a pair of opposing side beams 306 (only one is shown) and an exhaust duct 308. An upper pivot 310 mounted to a respective one of the opposing side beams 306 facilitates rotation of the upper reverser door 302 and a lower pivot 312 mounted to a respective one of the opposing side beams 306 facilitates rotation of the lower reverser door 304 about the lower pivot 312. A pair of actuators 314 is also mounted to respective ones of the opposing side beams 306 or, alternatively, to a base member 315 that is connected to a nacelle, such as the nacelle 114 referred to in FIG. 1. The actuators 314 may each include an actuator rod 316 and an actuator base 318 within which the actuator rod 316 retracts or extends.

With specific reference to one side of the thrust reverser 300, the thrust reverser 300 includes an upper door link 320 having a first end pivotally mounted to the actuator rod 316 and a second end pivotally mounted to the upper reverser door 302. Similarly, a lower door link 322 has a first end pivotally mounted to the actuator rod 316 and a second end pivotally mounted to the lower reverser door 304. A translating member 324 includes an upper beam 326 and a lower beam 328. The upper beam 326 and the lower beam 328 may be connected together by one or more rung members 330. The upper beam 326 may be slidably engaged with an upper support member (hidden) and the lower beam 328 may be slidably engaged with a lower support member 334. A plurality of rollers 336 may be positioned between respective pairs of the upper beam 326 and the upper support member (hidden) and the lower beam 328 and the lower support member 334. In various embodiments, a slider and track configuration may be positioned between the respective pairs of the upper beam 326 and the upper support member and the lower beam 328 and the lower support member 334. In various embodiments, the upper pivot 310 is mounted to the upper support member (hidden) and the lower pivot 312 is mounted to the lower support member 334. An upper beam link 338 connects the upper beam 326 to the actuator rod 316 and a lower beam link 340 connects the lower beam 328 to the actuator rod 316. A distal end 342 of the translating member 324 is connected to the exhaust duct 308.

As the actuator rod 316 extends or moves aft from a retracted position, as shown in FIG. 2, the upper beam link 338 translationally urges the upper beam 326 and the lower beam link 340 translationally urges the lower beam 328 and, hence, the exhaust duct 308 into the aft position, as illustrated. Similarly, as the actuator rod 316 extends or moves aft from a retracted position, the upper door link 320 pivotally urges the upper reverser door 302 and the lower door link 322 pivotally urges the lower reverser door 304 into the open position, as illustrated. Reversing the direction of movement of the actuator rod 316 switches the state of the thrust reverser 300 from the open or deployed position, as shown in FIG. 3, to the closed or retracted position, as shown in FIG. 2.

Figure 4:
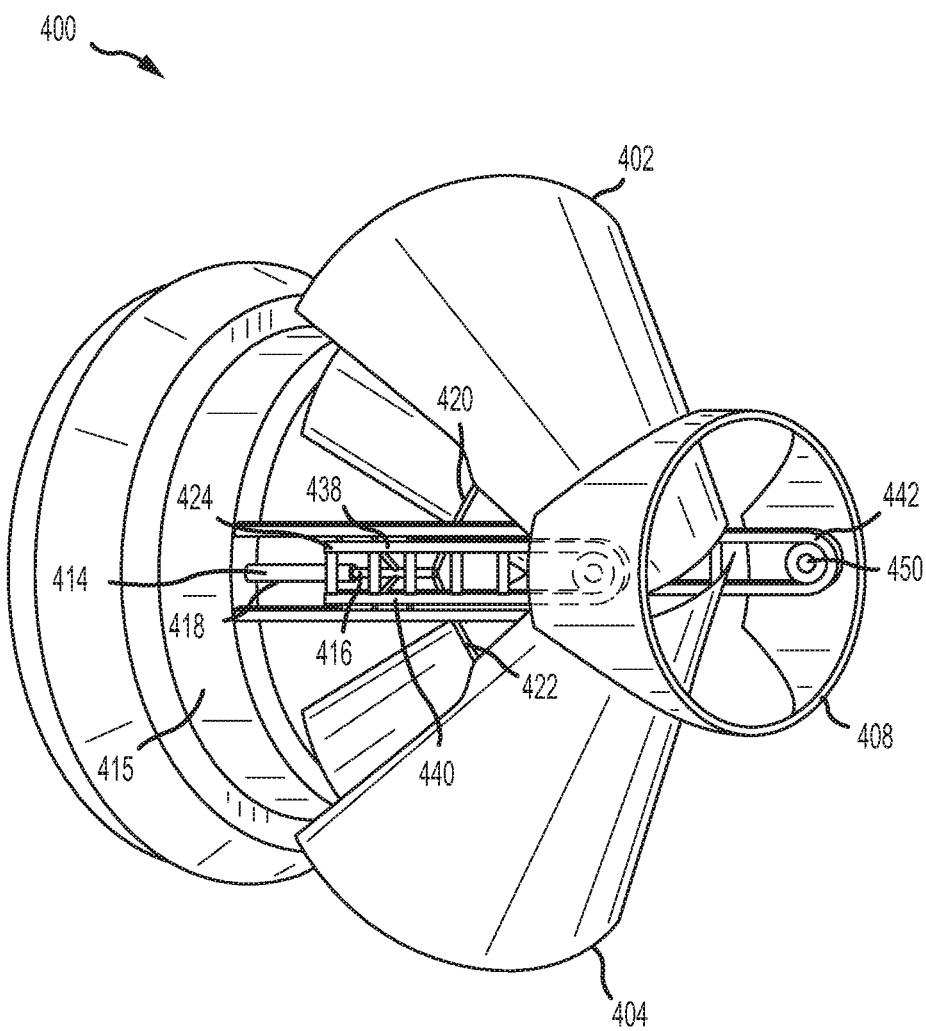
FIG. 4 is a perspective view of a thrust reverser for a gas turbine engine, according to various embodiments.

Referring now to FIG. 4, a perspective view of a thrust reverser 400 is illustrated, according to various embodiments. The thrust reverser 400 includes an upper reverser door 402, a lower reverser door 404 and an exhaust duct 408. Upper and lower pivots (not shown) facilitate rotation of the upper reverser door 402 and the lower reverser door 404 between open or deployed and closed or retracted positions. A pair of actuators 414 is mounted to a base member 415 that is connected to a nacelle, such as the nacelle 114 referred to in FIG. 1. The base member 415 may serves as a frame for mounting various components, including the actuators 414. The actuators 414 may each include an actuator rod 416 and an actuator base 418 within which the actuator rod 416 retracts or extends. In various embodiments, one or more side beams are included to facilitate pivoting the upper reverser door 402 and the lower reverser door 404 and mounting the actuators 414.

Similar to the above description, the thrust reverser 400 may include an upper door link 420 and a lower door link 422 configured for opening and closing the upper reverser door 402 and the lower reverser door 404 in response to movement of the actuator rod 416. An upper beam link 438 and a lower beam link 440 are configured to move a translating member 424 fore and aft in response to movement of the actuator rod 416, similar to the embodiments described above. In various embodiments, a distal end 442 of the translating member 424 is connected to the exhaust duct 408 by a link or coupling 450. The link or coupling 450 is generally configured to prevent the exhaust duct 408 from rotating with respect to the translating member 424. As the actuator rod 416 extends or moves aft from a retracted position, as shown in FIG. 2, the exhaust duct 408 translates aft and the upper reverser door 402 and the lower reverser door 404 rotate to an open position. As the actuator rod 416 retracts or moves fore from a deployed position, as shown in FIGS. 3 and 4, the exhaust duct 408 translates fore and the upper reverser door 402 and the lower reverser door 404 rotate to a closed position, as shown in FIG. 2.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A thrust reverser, comprising:
   a reverser door pivotally mounted to a frame;
   an exhaust duct translationally mounted to the frame:
   a first actuator having a first actuator rod connected to the reverser door and to the exhaust duct;
   a first door link connecting the reverser door to the first actuator rod;
   a first translating member connecting the exhaust duct to the first actuator rod;
   a first support member mounted to the frame, the first translating member configured to translate linearly with respect to the first support member;
   a first beam link connecting the first translating member to the first actuator rod; and
   a second actuator having a second actuator rod connected to the reverser door and to the exhaust duct,
   wherein the frame comprises a first side beam and wherein the reverser door is pivotally mounted to the first side beam and the exhaust duct is translationally mounted to the first side beam and
   wherein the frame comprises a second side beam and wherein the reverser door is pivotally mounted to both the first side beam and the second side beam.

2. The thrust reverser of claim 1, further comprising a second support member mounted to the frame and wherein the first translating member is configured to translate linearly with respect to the second support member.

3. The thrust reverser of claim 1 wherein the first translating member comprises a first beam configured to translate linearly with respect to the first support member.

4. The thrust reverser of claim 3, wherein the first translating member comprises a second beam spaced apart from the first beam and wherein the first beam and the second beam are connected by one or more rung members.

5. The thrust reverser of claim 3, further comprising a bearing system positioned between the first beam and the first support member.

6. The thrust reverser of claim 1, wherein the first actuator further comprises a base connected to the frame and wherein the first actuator rod is configured to translate linearly with respect to the base.

7. The thrust reverser of claim 1, further comprising a second door link connecting the reverser door to the second actuator rod, a second translating member connecting the exhaust duct to the second actuator rod and a second beam link connecting the second translating member to the second actuator rod.

8. A thrust reverser for a turbofan engine, comprising:
   an upper reverser door pivotally mounted to a frame and a lower reverser door pivotally mounted to the frame;
   an exhaust duct translationally mounted to the frame;
   a first actuator having a first actuator rod connected to the upper reverser door, the lower reverser door and the exhaust duct;
   a second actuator having a second actuator rod connected to the upper reverser door, the lower reverser door and the exhaust duct;
   a first upper door link connecting the upper reverser door to the first actuator rod;
   a first lower door link connecting the lower reverser door to the first actuator rod;
   a first translating member connecting the exhaust duct to the first actuator rod;
   a first beam link connecting the first translating member to the first actuator rod; and
   a first support member mounted to the frame, the first translating member configured to translate linearly with respect to the first support member;

wherein the frame comprises a first side beam and wherein the upper reverser door is pivotally mounted to the first side beam and the exhaust duct is translationally mounted to the first side beam and wherein the frame comprises a second side beam and wherein the upper reverser door is pivotally mounted to both the first side beam and the second side beam.

9. The thrust reverser of claim 8, further comprising a second upper door link connecting the upper reverser door to the second actuator rod.

10. The thrust reverser of claim 9, further comprising a second lower door link connecting the lower reverser door to the second actuator rod.

11. The thrust reverser of claim 10, further comprising a second translating member connecting the exhaust duct to the second actuator rod and a second support member mounted to the frame, the second translating member configured to translate linearly with respect to the second support member.

12. The thrust reverser of claim 11, further comprising a second beam link connecting the second translating member to the second actuator rod.

13. A gas turbine engine, comprising a core engine;

a nacelle surrounding the core engine;

a fan operably connected to the core engine and configured to drive air along a flow path in a bypass duct between the nacelle and an outer casing of the core engine;

a mixing section where exhaust from the core engine is mixed with air in the flow path as the air exits the flow path and a thrust reverser downstream of the mixing section, wherein the thrust reverser comprises an upper reverser door pivotally mounted to a frame and a lower reverser door pivotally mounted to the frame, an exhaust duct translationally mounted to the frame, a first actuator having a first actuator rod connected to the upper reverser door, the lower reverser door and the exhaust duct, a second actuator having a second actuator rod connected to the upper reverser door, the lower reverser door and the exhaust duct, a first translating member connecting the exhaust duct to the first actuator rod, a first support member mounted to the frame, the first translating member configured to translate linearly with respect to the first support member, a first beam link connecting the first translating member to the first actuator rod, a first upper door link connecting the upper reverser door to the first actuator rod, a first lower door link connecting the lower reverser door to the first actuator rod, wherein the frame comprises a first side beam and wherein the upper reverser door is pivotally mounted to the first side beam and the exhaust duct is translationally mounted to the first side beam and wherein the frame comprises a second side beam and wherein the upper reverser door is pivotally mounted to both the first side beam and the second side beam.

14. The gas turbine engine of claim 13, wherein the thrust reverser further comprises a second upper door link connecting the upper reverser door to the second actuator rod, a second lower door link connecting the lower reverser door to the second actuator rod, a second translating member connecting the exhaust duct to the second actuator rod, a second support member mounted to the frame, the second translating member configured to translate linearly with respect to the second support member and a second beam link connecting the second translating member to the second actuator rod.

* * * * *